United States Patent [19]
Jolissaint et al.

[11] Patent Number: 5,276,440
[45] Date of Patent: Jan. 4, 1994

[54] NETWORK DEVICE INFORMATION EXCHANGE

[75] Inventors: Charles H. Jolissaint, Sunnyvale, Calif.; Ronald D. Martin, Durham; Stephen A. Owen, Raleigh, both of N.C.; William C. Schaal, Turnersville, N.J.; Gary R. Shippy, Cary, N.C.; John G. Stevenson, Raleigh, N.C.; Kian-Bon K. Sy, Cary, N.C.

[73] Assignee: International Business Machines Corporation, Santa Clara, Calif.

[21] Appl. No.: 701,322

[22] Filed: May 6, 1991

Related U.S. Application Data

[63] Continuation of Ser. No. 600,129, Oct. 17, 1990, abandoned, which is a continuation of Ser. No. 311,605, Feb. 16, 1989, abandoned.

[51] Int. Cl.$^5$ ................................................. H04J 1/16
[52] U.S. Cl. ............................ 340/825.02; 340/825.16; 370/60
[58] Field of Search ................ 340/825.02, 825.15, 340/825.16, 827, 826; 370/14, 16, 94.1, 60; 379/2, 10, 14, 32, 33

[56] References Cited

U.S. PATENT DOCUMENTS

| | | | |
|---|---|---|---|
| 4,644,532 | 2/1987 | George et al. | 370/94 |
| 4,775,973 | 10/1988 | Tomberlin et al. | 370/60 |
| 4,825,206 | 4/1989 | Brice, Jr. et al. | 340/825.02 |

*Primary Examiner*—Donald J. Yusko
*Assistant Examiner*—Michael Horabik
*Attorney, Agent, or Firm*—Kenneth C. Hill; Andrew J. Dillon

[57] ABSTRACT

A network has a plurality of devices connected together in pairs. When a physical connection between a pair of devices is initiated, the devices exchange information regarding a unique device identifier, and details of the physical connection. This information is provided in a report to a network manager. When a failure occurs on the network, the connection information is used to locate the failure.

3 Claims, 3 Drawing Sheets

| ERROR REPORT NUMBER | ER1 | ER2 | ER3 | ER4 |
|---|---|---|---|---|
| LOGICAL CONNECTION | N1::N5 | N1::N5 | N1::N5 | N1::N5 |
| REPORTING DEVICE | NODE1 | NODE3 | NODE4 | NODE5 |
| ADJACENT DEVICE | NODE3 | NODE4 | NODE3 | NODE4 |
| ERROR TYPE | E1 | E2 | E3 | E4 |
| TIME STAMP | $T_{ER1}$ | $T_{ER2}$ | $T_{ER3}$ | $T_{ER4}$ |

NETWORK DEVICE INFORMATION EXCHANGE

This application is a continuation of application Ser. No. 07/600,129, filed Oct. 17, 1990 now 'abandoned', which is a continuation of application Ser. No. 07/311,605 filed Feb. 16, 1989 'abandoned'.

BACKGROUND OF THE INVENTION

1. Technical Field

The present invention relates generally to computer systems networks, and more specifically to a system and method for reporting network connectivity information.

2. Background Art

Computer networks are becoming increasingly common. Large numbers of devices, including general purpose computer systems, input/output terminals, and special purpose peripherals, may often be linked into a single network.

Many different network protocols are currently in use. Examples of common, high level protocols include System Network Architecture (SNA), produced by IBM Corporation and ROLMLINK, produced by ROLM Systems Inc.. Other examples of network interconnection techniques are found in U.S. Pat. No. 4,466,063, SYSTEM INTERCOMMUNICATION PROCESSOR USED IN DISTRIBUTED DATA PROCESSING SYSTEM; and U.S. Pat. No. 4,412,285, MULTI-PROCESSOR INTERCOMMUNICATION SYSTEM AND METHOD.

A wide variety of physical device interconnection techniques are also in common use. Networked devices may be connected to a common communications bus, as is used in Ethernet networks. Another physical connection technique, used to connect two devices together using a twisted wire pair, is described in U.S. Pat. No. 4,642,805, DIGITAL LINK FOR TELEPHONE STATION SETS.

Several networks of the same type may be connected together using interface devices known as bridges. Other interface devices, sometimes referred to as gateways, may be used to connect together several networks of different types. Some networks become quite large, having several hundreds, or even several thousands, of devices connected together into a single network. In such systems, the interconnections between devices attached to the network may become quite complex, with switching systems providing multiple communication paths between a single pair of devices.

The devices attached to a large network may also display wide diversity. Such devices may include input/output terminals, other peripherals such as machine controllers and data gathering equipment, general purpose computers, network controllers, communication switching systems, telephones and various shared resources such as large capacity disk drives. Almost any type of computer system or component may be connected to a network.

In order to control function of the network, and keep track of resource usage, many network designs provide for one or more devices in a central network location to be designated as a network manager. A network manager may monitor traffic on the network, and may be able to control or influence message routing in some networks. The network manager often accepts error reports when malfunctions occur in devices attached to the network, and provides a centralized location where a person responsible for network operation may monitor the state of the network.

When a network error occurs, which is caused by failure of an attached device or component thereof, or a failure of a physical interconnection link, the location of the error may be very difficult to trace. A single failure may affect many different physical interconnections between devices, such as would happen when the power supply for a Computerized Branch Exchange (CBX) fails. Even a single-point physical failure may cause the failure of a large number of logical connections. This could happen for example, when a single optical fiber carrying a large number of communication channels is cut.

When failures occur in certain critical devices, a large number of error reports may be made to the network manager. Typically, every device which was supporting a communications link which passed through a failed device at the time of failure will report such communications failure to the network manager. These reports often reach the network manager at different times, and typically do not allow the network manager to pinpoint the source of the problem. If two independent failures occur at approximately the same time, the difficulties of determining the source of the errors is compounded.

Some networks attempt to minimize the amount of redundant error reporting which occurs to the network manager by providing intermediate devices which coordinate the error reports of several devices below them in the network hierarchy. Also, critical network resources may be designed to contain redundant subsystems in order to minimize the impact of a single subsystem failure. An example of such a redundant system may be found in U.S. Pat. No. 4,634,110 FAULT DETECTION AND REDUNDANCY MANAGEMENT SYSTEM.

One reason it is often very difficult to track down a single failure which gives rise to multiple error reports is that the network manager doesn't have knowledge of all the details of the physical interconnections between the devices of the network. Individual devices may be attached to and removed from the network quite easily, and may be moved from one connection point to another without a report being made to a central authority. This is especially true in environments such as Integrated Systems Digital Networks (ISDN), in which a terminal device may be moved from one connection to another simply by changing the location of a modular wall plug. Although the interconnection graph of a network is relatively static in that most devices are rarely moved, it is possible to change such graph quite drastically in a short period of time. Since network interconnections are so flexible, it is difficult to provide a current connectivity graph which may be used by the network manager to determine the location of a failure when multiple error reports are caused by a single failure.

It would be desirable to provide a method which would provide current network configuration information to a network manager. It would also be desirable for reports on network configuration changes to be made automatically. It would further be desirable for a network manager to be able to correlate multiple error reports in order to determine the location of a device failure.

SUMMARY OF THE INVENTION

It is therefore an object of the present invention to provide a communications network which automatically communicates physical connectivity information to a central network location such as a network manager.

It is another object of the present invention to provide such a network in which a network manager may correlate error reports to determine the location of a device failure.

Therefore, in order to accomplish these and other objects and advantages of the present invention as set forth below, a network is provided in which each device attached thereto reports details of its physical connections to a central network location such as a network manager. Such connectivity reports are made automatically, and may be made whenever a communications link between two devices is initialized. A routine check initiated by the network manager may also be used to query the devices on the network and cause them to report their current physical interconnections. The network manager retains this information, and uses it to correlate error reports in order to determine the location of device failure on the network.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
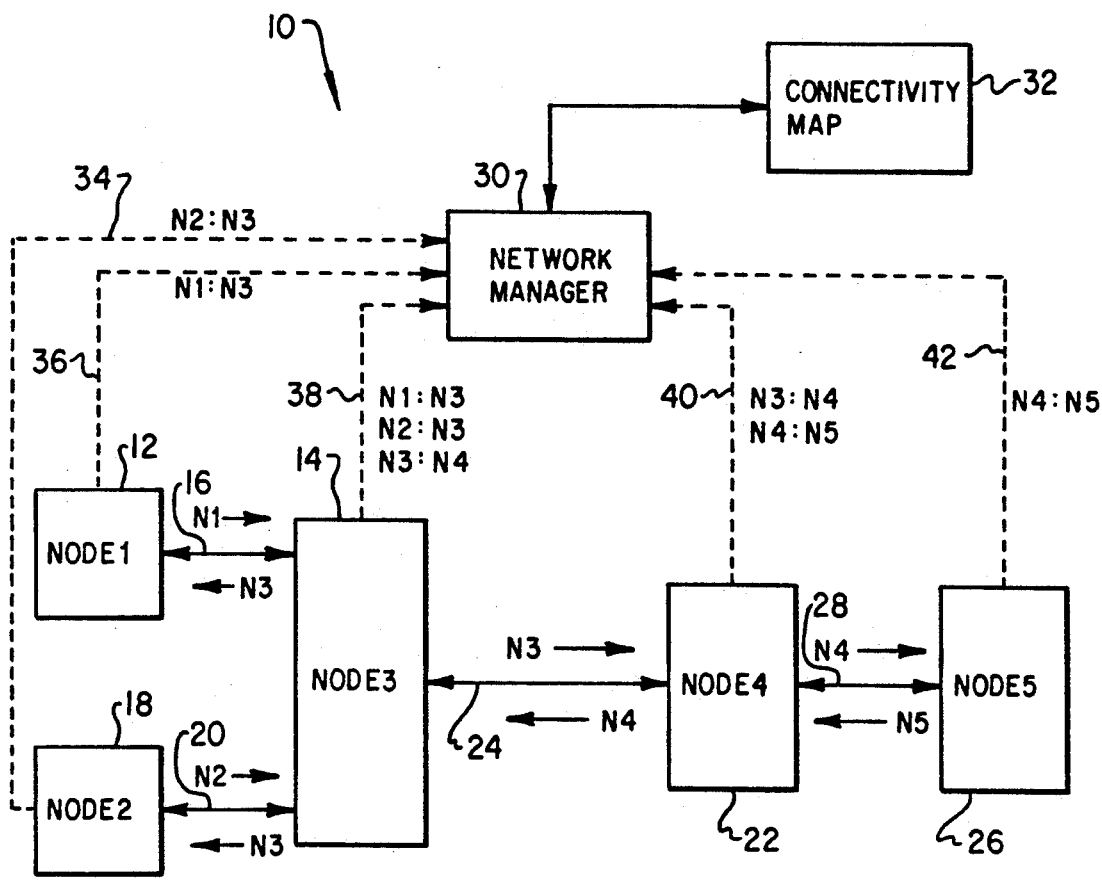
FIG. 1 is a block diagram of a portion of a communications network.

FIG. 1 shows a portion of a communications network. Devices attached together in the network will, consistent with standard usage, be referred to as nodes. The type of device represented by each node in the network is not part of the present invention.

Within the network 10, a node 12 is connected to node 14 through a direct, physical communication link 16. Node 18 is connected to node 14 through direct link 20. Node 14 is connected to node 22 through direct link 24. In turn, node 22 is connected to node 26 directly through direct link 28.

For convenience, nodes 12, 18, 14, 22, and 26, will also be referred to as NODE1, NODE2, NODE3, NODE4, and NODE5, respectively.

A network manager 30 is a node in the network 10, and accesses a connectivity map 32. The network manager 30 is typically a general purpose computer system programmed to perform network manager functions. The nodes shown in FIG. 1 are connected to the network manager 30 by links 25 34, 36, 38, 40, and 42. The links 34-42 are shown as dashed lines to indicate that such links are not necessarily direct physical connections such as the direct links 16, 20, 24, 28. Any or all of such nodes may be connected directly to the network manager 30, but such direct connection is not necessary. Nodes which are not connected directly to the network manager 30 may send messages thereto using the standard message routing protocol of the network 10. Whenever a physical connection is made between nodes in the network 10, the direct link is uniquely identifiable by device. Some devices, such as simple video display terminals, are only capable of a single physical connection. Other devices have several separate communications ports, which may each be connected to a separate device. Each port is uniquely identifiable within the device, typically being assigned a port number. Some devices, such as a Computerized Branch Exchange (CBX), have a very large number of communications ports. Again, each of these communications ports is uniquely identifiable within the CBX.

When a device is first attached to another device within the network, the direct link between them must be initialized. Initialization of a direct link typically includes testing of the link by each device, and an exchange of port parameters. According to the present invention, whenever a direct link between two ports is initialize each device also sends an information package to the other. This information package describes details of the sending device which will be described further in connection with FIG. 2.

When a device has received information from the other device on a newly established direct link, it includes this information in a report defining the direct link which is made to the network manager. The report so made is a 2-tuple which includes low level information about the node making the report, and the same information about the device at the other end of the direct link. As shown in FIG. 1, when direct link 16 is first initialized between NODE1 and NODE3, each device communicates the appropriate information to the other across direct link 16. N1 and N3 designate the information passed describing the identification information of NODE1 and NODE3, respectively. When direct link 24 between NODE3 and NODE4 is initialized, N3 and N4 is the information exchanged between the nodes. Every pair of nodes connected by a direct link exchanges like information.

Once a node has received the exchanged information from the other node on a direct link, it combines such information with that describing itself into a 2-tuple to be transmitted to the network manager 30. As shown in FIG. 1, two items of information separated by a colon represents such a 2-tuple. Thus, the report N2:N3 is the report sent by NODE2 on link 34, and N1:N3 is the report sent by NODE1 on link 36. The same report is sent to the network manger 30 by the devices at both ends of a direct link, so that the reports N1:N3 and N2:N3 are also communicated to the network manager 30 by NODE 3 on link 38. The reports contain nearly identical information, with the only difference being an identification to the network manger 30 of which device submitted the report. As described in connection with FIG. 5, the report may not be sent if the information has not changed from a previous report.

As reports describing connections are received by the network manger 30, they are assembled into the connectivity map 32. This map is updated whenever a new report is received by the network manager 30. The connectivity map 32 is preferably a topologic map, or graph, which indicates which nodes are connected by direct links, rather than a map giving relative physical locations of the nodes.

Figure 2:
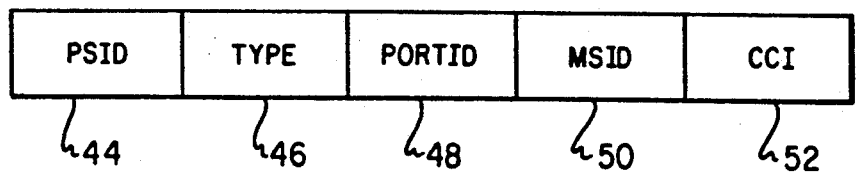
FIG. 2 shows information which is communicated between adjacent nodes in a communications system.

FIG. 2 shows the information preferably exchanged by the devices at each end of a direct link, and included in the connectivity reports to the network manager 30. This information consists of a packet containing five major fields. Some fields contain subfields as will now be described.

The Product Set Identifier (PSID) field 44 is a device identifier which is unique to every single device which may be attached to the network. The PSID is preferably broken down into several subfields. These subfields include a manufacturer identifier, a machine type, a model number, and a unique serial number. Other subfields may optionally be included. A text field may include the manufacturer's name. Engineering change levels, or sub-model numbers, may also be included. If the product emulates a product by another manufacturer, the machine and model of the emulated product may also be included.

The TYPE field 46 is used to categorize a device into its functional group. Examples of device types which are typically connected to networks are controllers, multiplexors, switches, signal processors, modems, terminals, and phones. If the network 10 is an ISDN network, an ISDN device type may be included to describe the role which the device plays in the connection with respect to the ISDN reference model. In an ISDN network, the device classifications include TE1, TE2, TA, NT2, NT1, LT, and ET.

The PORT ID field 48 is the internal hardware port identification to which the direct link is connected. Some devices have only a single communications port, while others will have several. In devices having a small number of communications ports, the ports will typically simply be numbered in increasing order.

Some devices, such as a CBX, have a very large number of communications ports. For these devices, the PORT ID 48 may not be a simple number. For example, a CBX PORT ID could include the following five subfields: internal node number, which indicates the CBX switching bank; shelf number, which indicates the position within the switching bank; slot number, which indicates the position in the shelf of the card containing the communications port; a port number assigned to the card; and a channel number, which indicates the position on the card of the port.

The Management Services Identifier (MSID) field 50 identifies the location of the controlling manager responsible for the management activities and reports of the device. The MSID field 50 may contain, for example, the telephone number of a repair center, or a telephone company operation center. It may also contain the network address of another device on the network. The MSID field is preferably used simply to identify responsible parties in case of a device failure.

The Call Connection Identifier (CCI) field 52 contains network identifiers used when establishing logical connections within the network. If the device is a telephone, or connected to a telephone line, the CCI field 52 preferably includes the telephone number used to reach the device. The CCI field 52 would also preferably include any sub-address components used to identify multiple devices which share a single telephone line.

When a logical communications link is made between nodes on the network, 2-tuples describing direct links from each device in the logical link are passed on as the link is set up in order to identify the devices at each end of the logical link.

When a direct link is first initialized, each device sends to the other the information just described. Combining the information received from the other device with its own defines a unique physical connection within the network. If two devices are connected directly together by more than one physical connection, the 2-tuples defining each connection will still be unique, inasmuch as the port numbers used by each device will be different for each connection.

The information exchange described above occurs each time a direct link is initialized. Such information may also be transferred when a command is received from the network manager 30 to update the status of all direct links. Such a report may be requested periodically by the network manager in order to ensure that the connectivity map 32 is accurate.

Figures 3, 4:
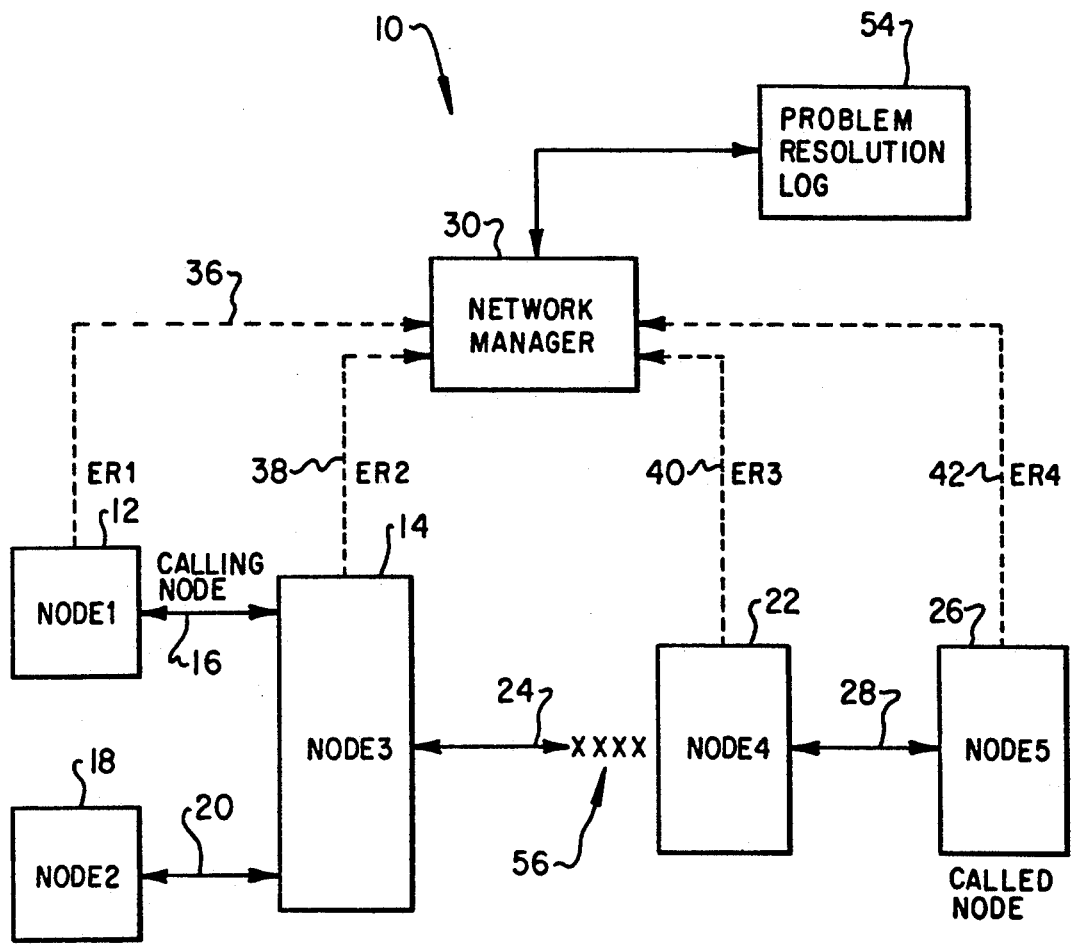
FIG. 3 is a block diagram of a communications network indicating failure of a single device.
FIG. 4 illustrates the contents of several error reports made as a result of the failure illustrated in FIG. 3.

FIG. 3 shows the same network 10 of FIG. 1. A problem resolution log 54 is attached to the network manager 30. When an error report, indicating a problem or failure of some type on the network 10 is received by the network manger 30, it is placed into the problem resolution log 54. The information contained in the problem resolution log 54 is used by the network manager 30 to determine the location of failure of a device or a direct link. Once the location of a failure is pinpointed, maintenance or repair personnel may be dispatched to correct the problem.

Many different types of failures can occur over the network. A device can suffer a hardware failure, or a direct link can be broken. More commonly, conditions on the network can cause failure of a call between two nodes. For example, a switching device can become overloaded, preventing a call from going through. Noise can cause unacceptable degradation of the signal over a link. A software failure within a device can cause numerous problems. The symptoms of a single failure tend to be varied, and expressed in different ways to different devices.

In FIG. 3, NODE1 has initiated a call to NODE5. NODE1 is therefore referred to as the calling node, and NODE5 the called node. The logical link between NODE1 and NODE5 includes the path link 16: NODE3: link 24: NODE4: link 28. A device failure anywhere along this path, in addition to a failure at either terminating node 12, 26, will interrupt the logical link. Location 56 indicates a physical break in direct link 24, such as might occur when a signal cable is severed or removed from its connecting socket.

The logical link between NODE1 and NODE5 may be represented by N1::N5. NODE3 and NODE4 are aware of the identity of this logical link, as well as knowing how it is mapped to the physical connections to and from themselves. When the failure 56 occurs, the logical link N1::N5 is broken. This gives rise to a communications error, which is reported to the network manager 30 by NODE1 as an error report ER1. Such error reports are often termed alerts within networked communications systems. NODE1 generates ER1 after it receives a report from NODE3 that the logical link has been interrupted. NODE3 communicates error report ER2 to the network manager 30 after it senses that no more communication is possible over direct link 24. NODE4 generates report ER3 for the same reason, and NODE5 generates report ER4 after it is no longer able to communicate with NODE1.

Due to various delays which may occur in the logical paths 36, 38, 40, and 42, the order of arrival or the error reports, ER1, ER2, ER3, and ER4 at the network manager 30 is indeterminate. FIG. 3 illustrates a failure which does not interfere with the entire function of NODE4, which allows NODE4 to generate error report ER3. If there were a catastrophic failure of NODE4 causing a complete device shutdown, NODE4 might not be able to generate report ER3. However, the information contained in the remaining error reports should allow the network manager 30 to correlate the information contained in those reports and pinpoint the location of the device failure.

FIG. 4 illustrates the information contained in the various error reports, and one manner in which they might be correlated by the network manger 30 in order to determine the location of the failure. Each report describes the logical link to which it applies, in this case, N1::N5. The reporting device is identified, as is the physically adjacent device. Both of these device definitions include the PORT ID number of the connection, so that a single physical connection is uniquely identified. The type of error is identified, and a time stamp indicating the time the report was generated by the reporting device is included.

Each device reports the link on which it detected the error. In many cases, a device reporting an error will not be aware of the actual hardware failure which gave rise to the error. Thus, it may only report the logical link which is involved, and the affected connections to its immediate neighbors.

Although the physical connections are relatively static, the logical links between nodes vary dynamically. The network manager 30 is unaware of the logical links which exist on the network 10 until an error reported. At that point, the logical connection identifier becomes a primary mechanism which the network manager 30 uses to correlate the error reports which it receives. The call may be traced from both terminal nodes, in this case NODE1 and NODE5, until the source of the error is found.

Using the reports shown in FIG. 4, the network manager 30 can trace good direct links between NODE1 and NODE3, and between NODE5 and NODE4. Therefore, the error is traced to a location between NODE3 and NODE4. The network manager 30 may request NODE3 and NODE4 to perform local tests, which may indicate the problem if it is one of the interfaces at either end of link 24. In any case, a report showing a device failure along the communications line 24 is generated in order to guide a repair technician quickly to the location of the failure.

Figure 5:
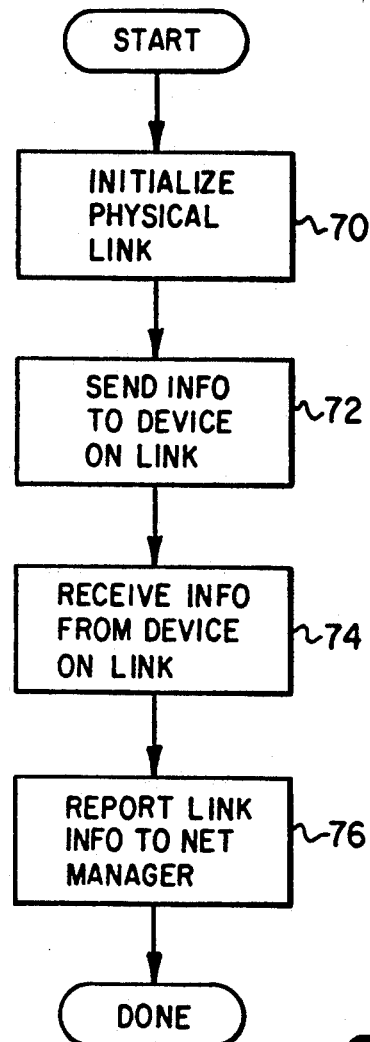
FIG. 5 is a flow chart illustrating a sequence of steps undertaken by a device when it is connected to a network.

FIG. 5 shows a procedure used by each device attached to the network at the time a new physical link is initialized. The first step is to actually initialize the link 70, which includes transfer of test and control signals between the devices, after the physical connection is made. Once the link is initialized, a device sends the information described in connection with FIG. 2 to the device at the other end of the link 72. It then waits until it receives the corresponding information from the other device 74. The order of these two steps 72, 74 is not fixed. A device may receive the exchange information from the other device prior to sending out its own information. In fact, in half-duplex communication channels, one device would have to receive the other devices information before sending its own, since both devices cannot transmit simultaneously. Finally, the information from both devices is put together and reported to the network manager 76.

If the other device does not support this exchange of information, step 74 will never be completed. In this event, what happens next depends on the preferences of the network designers. As one possibility, a device which does not receive a report from the device at the other end of the link simply does not make a report concerning that particular communications port to the network manager. A preferred alternative is for the device which does support the information exchange to send a partial report to the network manager. This allows the network manager to understand that there is a node in the network which is not identified.

When a device sends a report to the network manager, a local copy is preferably retained. When a new report is sent to the network manager, a check is made to see if the same report has already been sent. If such is the case, the duplicate report need not be sent. Such a situation could arise, for example, if a data terminal were switched off each weekend. When it is switched on each Monday morning, it would not be necessary for a CBX to which it is connected to send a report, since the network manager already knows of the connection. This type of check can help to minimize network traffic.

Figure 6:
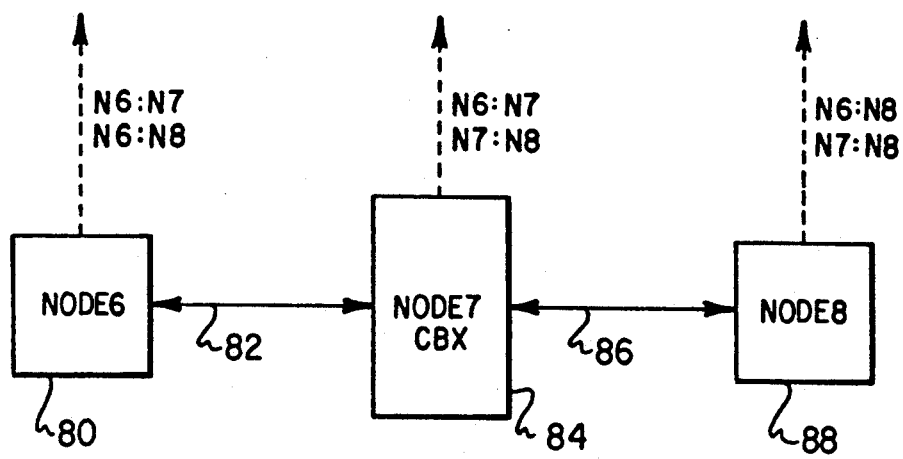
FIG. 6 is a block diagram of a portion of a network indicating connectivity reports made for logical connections and physical connections between devices.

Although the system described above has been illustrated with application to direct links between two devices, it applies to logical links as well. FIG. 6 illustrates the exchange of information for a logical link.

A node 80 is connected through a direct link 82 to node 84. Node 84 is, in turn, connected through direct link 86 to node 88. Nodes 80, 84, and 88 will also be referred to as NODE6, NODE7, and NODE8, respectively.

For various reasons, it may not be feasible to run a cable from NODE6 to NODE8 in order to establish a direct link. However, it might be desirable to establish a dedicated logical link between NODE6 and NODE8. This dedicated, logical link can be routed through NODE7, which is a Computerized Branch Exchange. Such a logical link might be made, for example, between two devices attached to previously installed telephone lines which are routed through NODE7.

When NODE6 is first physically connected to NODE7, the connection report N6:N7 is sent to the network manager by both NODE6 and NODE7 as described previously. When NODE7 and NODE8 are first physically connected over link 86, the report N7:N8 is likewise sent to the network manager by NODE7 and NODE8.

Sometime after the direct links 82 and 86 are made, the logical link N6:N8 can be created. NODE6 and NODE8 simply exchange identifying information as if they were physically adjacent. The report N6:N8 is sent to the network manager in the usual manner. If the logical link between NODE6 and NODE8 fails, for example, due to a failure in NODE7, NODE6 and NODE8 will report errors on both the direct links N6:N7 and N7:N8, and the logical link N6:N8.

The information contained in the connectivity map 32 can be used as described above for management of problems occurring on the network. The connectivity map 32 describes the direct links and dedicated logical links between all devices on the network, and identifies each device. As will be apparent to those skilled in the art, this same information can also be used by the network manager 30 in many other ways.

The product information contained in the connectivity map 32 can be used for inventory management. A simple search through the connectivity map 32 can produce a report of the location of any device, with respect to its neighbors, or reports of the numbers and locations of particular device types. The connectivity information can also be used for configuration management. Network configuration decisions can be made based on complete current information regarding all connections between all device.

Network operations management can also make use of the connectivity map 32. The capabilities of each device are known based on the device type information. The network manager 30 can dynamically allocate the network load based upon its knowledge of device and interconnection capabilities. A security system can make use of device identification information to prevent transactions between certain types of devices. Many other possible uses of current, low level connectivity information will become apparent to those skilled in the art.

An information exchange protocol has been described which is suitable for use with communications networks. Different types of devices can be attached to the network, including phones, computer systems, miscellaneous shared system resources, and switches and controllers. When a device is first attached to another device, identification information is exchanged between the two devices and reported to a network manager. This exchange can also be made at later times, such as upon request by the system manager or a local network controller, or on a predetermined, periodic basis.

The information exchanged between adjacent devices includes unique device identifiers, and information sufficient to uniquely identify a particular physical link. Multiple physical links between two devices will be uniquely identified because each link will be attached to a different communications port of each device.

When a failure in a device occurs on the network, multiple error reports are generated and sent to the network manager. Using known information about the physical connections of the network, these reports can be correlated by the network manager, and the location of the failure determined. The physical connectivity information can be used in numerous other ways by network managers.

Fixed, logical connections between two devices can also be made and reported. These logical links can pass through any number of intervening devices, and share output ports with defined physical connections. Depending upon the type of network being used, the logical links may be communicated differently, although the exchanged information is the same. For example, in an ISDN network, the D channel can be used to exchange device identification information between physically adjacent devices. To exchange information for the logical connection, the B channel could be used.

While the invention has been particularly shown and described with reference to a preferred embodiment, it will be understood by those skilled in the art that various changes in form and detail may be made therein without departing from the spirit and scope of the invention.

We claim:

1. A method for determining the location of a failure on a network of interconnected nodes, comprising the steps of:

for each pair of nodes connected by a direct link, reporting to a single central network location the identity of the nodes of the pair and physical communications ports of each node through which the pair are connected;

establishing a logical link between a pair of network nodes which have no direct link, the logical link including identifiable direct links between nodes;

when a network failure occurs so as to interrupt communication over the logical link, sending an error message to the central network location from each node in the logical link, such error messages identifying the logical link and the direct link on which the failure occurred relative to the node sending the message; and at the central network location, selecting received error reports which identify the logical link and correlating the received error reports to determine a location of the network failure.

2. The method of claim 1, further comprising the steps of:

responsive to establishment of the logical link reporting the logical link in the same manner as a direct link between the pair of nodes, thereby providing a dedicated logical link which appears to be a direct link to the central network location; and when a network failure occurs on the dedicated logical link, sending an error report from each of the pair of nodes to the central network location in the same manner as an error report for a direct link between a pair of nodes.

3. A method for identifying the topology of a network containing a plurality of nodes connected by direct links, comprising the steps of:

when a direct link is established between a pair of nodes of the network, reporting the direct link from each node to a central network node location;

including in the reporting step identification of each node and identification of communication ports of the nodes used by the direct link; and retaining the reported information in the central network node location, whereby the communication ports used by the direct link can be identified at the central network node location.

* * * * *